United States Patent [19]

Miles et al.

[11] Patent Number: 5,076,951

[45] Date of Patent: Dec. 31, 1991

[54] ANTIFREEZE COMPOSITIONS

[75] Inventors: Peter Miles; Upendra P. Gandhi, both of Bramhall, England

[73] Assignee: Ciba-Geigy Corporation, Ardsley, N.Y.

[21] Appl. No.: 522,691

[22] Filed: May 14, 1990

[30] Foreign Application Priority Data

May 19, 1989 [GB] United Kingdom ............... 8911569

[51] Int. Cl.$^5$ .............................................. C09K 5/00
[52] U.S. Cl. ........................................ 252/79; 252/75; 252/76; 252/77; 252/78.5; 252/180; 252/181
[58] Field of Search ............... 252/180, 181, 73, 76, 252/79, 75, 77, 78.5

[56] References Cited

U.S. PATENT DOCUMENTS

| | | | |
|---|---|---|---|
| 3,032,500 | 5/1962 | Milks et al. | 252/8.554 |
| 3,697,520 | 10/1972 | Winter | 544/196 |
| 4,046,707 | 9/1977 | Smith et al. | 252/180 |
| 4,126,549 | 11/1978 | Jones et al. | 210/701 |
| 4,370,280 | 1/1983 | Oediger et al. | 558/350 |
| 4,374,733 | 2/1983 | Snyder et al. | 210/701 |
| 4,402,907 | 9/1983 | Clark | 422/7 |
| 4,648,982 | 3/1987 | Gritti | 252/75 |
| 4,681,686 | 7/1987 | Richardson et al. | 210/699 |
| 4,689,200 | 8/1987 | Cook et al. | 422/15 |
| 4,711,735 | 12/1987 | Gulley | 252/75 |
| 4,743,393 | 5/1988 | Hirozawa | 252/75 |

FOREIGN PATENT DOCUMENTS 1225404 8/1987 Canada .
0010918 5/1980 European Pat. Off. .

OTHER PUBLICATIONS

Derwent Abst. No. 85-039231/07.
Derwent Abst. No. 87-322330/46.
Derwent Abst. No. 88-002559/01.

Primary Examiner—Paul Lieberman
Assistant Examiner—Christine A. Skane
Attorney, Agent, or Firm—Luther A. R. Hall

[57] ABSTRACT

The present invention provides a polyhydric alcohol antifreeze composition comprising A) as hard water deposition inhibitor, a hydrolyzed copolymer of maleic anhydride with a mono-ethylenically unsaturated monomer, or mixture of monomers, the molar ratio of maleic anhydride to other monomers being from 2.5:1 to 100:1, and the molecular weight of the copolymer being below 1000; and optionally B) as corrosion inhibitor, at least one of B-1) a triazine compound having the formula (I):

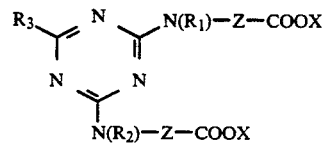

wherein Z is a $C_1$–$C_{11}$ alkylene group, X is hydrogen, an alkali metal or mono-, di- or tri-ethanolamine, $R_1$ and $R_2$, independently, are hydrogen or methyl and $R_3$ is a group —$NR_4R_5$ in which $R_4$ is $C_1$–$C_{12}$ alkyl or —Z—COOX in which Z and X have their previous significance, and $R_5$ is hydrogen or $C_1$–$C_{12}$ alkyl; B-2) 2-hydroxyphosphonoacetic acid; B-3) (2-Benzo-thiazolylthio)succinic acid and B-4) (2-benzothiazolylthio)acetic acid.

14 Claims, No Drawings

ANTIFREEZE COMPOSITIONS

The present invention relates to antifreeze compositions, especially to antifreeze concentrates and coolants containing additives which are effective in combating solder corrosion and hard water deposits.

It is conventional practice to include in modern antifreeze compositions, additives which are designed to inhibit corrosion of the various metals which are comprised in systems to be protected e.g. the cooling system of an internal-combustion engine. It is also known to include hard water deposit inhibitors in antifreeze compositions in order to combat the deposition of hard water salts, e.g. calcium carbonates, from water contained in the cooling system so treated.

An example of a known antifreeze composition is that disclosed in European Patent Application No. 245557. This reference describes a corrosion-inhibited and stabilized liquid alcohol antifreeze/coolant composition comprising alkali metal borate and alkali metal silicate, as corrosion inhibitors; and, as hard water deposit inhibitor, at least one of hydrocarbyl aminophosphonic acids, phosphino polycarboxylic acids and polyacrylic acids, and/or their alkali metal salts.

In Japanese Patent Application 62/205183, there are disclosed ethylene glycol-based antifreeze compositions, for use in automobile radiators, comprising at least one of a) a specified alkenylamino phosphonic acid and/or its alkali metal salts, b) a specified phosphinopolycarboxylic acid and/or its alkali metal salts; and c) a polyacrylic acid and/or its alkali metal salts.

Still further, in European Patent Application No. 248346, there are indicated polyhydroxy-alcohol based antifreeze concentrates, for engines comprising aluminium parts, comprising a) a corrosion inhibitor containing a hetero-polymolybdate compound, b) buffer compound, c) a water-soluble alkali metal nitrate, d) water and e) a polyhydroxy alcohol.

None of the known antifreeze compositions provides completely satisfactory combined corrosion inhibition and calcium salt deposition prevention properties.

Surprisingly, we have now found that by selecting a specific scale inhibitor, and using it optionally, but preferably in combination with specified corrosion inhibitors an antifreeze composition is provided having excellent combined corrosion inhibiting and hard water deposit inhibiting properties.

Accordingly, the present invention provides a polyhydric alcohol antifreeze composition comprising A) as hard water deposition inhibitor, a hydrolyzed copolymer of maleic anhydride with a mono-ethylenically unsaturated monomer, or mixture of monomers, the molar ratio of maleic anhydride to other monomers being from 2.5:1 to 100:1, and the molecular weight of the copolymer being below 1000. Optionally, but preferably, the polyhydric alcohol antifreeze composition described above comprises B) as corrosion inhibitor, at least one of B-1) a trazine compound having the formula (I):

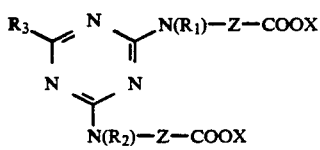

wherein Z is a $C_1$-$C_{11}$ alkylene group, X is hydrogen, an alkali metal or mono-, di- or tri-ethanolamine, $R_1$ and $R_2$, independently, are hydrogen or methyl and $R_3$ is a group —$NR_4R_5$ in which $R_4$ is $C_1$-$C_{12}$ alkyl or —Z—COOX in which Z and X have their previous significance, and $R_5$ is hydrogen or $C_1$-$C_{12}$ alkyl; B-2) 2-hydroxyphosphonoacetic acid; B-3) (2-Benzo-thiazolylthio)succinic acid or B-4) (2-benzothiazolylthio)-acetic acid.

The hard water deposit inhibiting component, component A), has been disclosed as a scale inhibitor for aqueous systems in British Patent Specification No. 1414918, which also describes processes for the production of component A). Preferably, component A) is a copolymer of maleic anhydride/ethyl acrylate/vinyl acetate. The antifreeze base composition can be any water-soluble polyhydric alcohol, e.g. ethylene glycol, diethylene glycol, propylene glycol, dipropylene glycol, triethylene glycol or glycerol. Mixtures of ethylene glycol and diethylene glycol are frequently employed.

Hard-water deposit inhibiting component A) is preferably present in the antifreeze compositions of the present invention in amount of from 0.001 to 1%, more preferably from 0.005 to 0.5% and, especially, from 0.01 to 0.05% by weight, each based on the total weight of the antifreeze composition.

The use of the triazine compound of formula I as corrosion inhibitors in aqueous systems in contact with iron is described in European Patent Specification No. 46139.

Examples of specific compounds of formula I are as follows:

2,4,6-Tris(5'-carboxypentylamino)-1,3,5-triazine,
2,4,6-Tris(carboxymethylamino)-1,3,5-triazine,
2,4,6-Tris(3'-carboxypropylamino)-1,3,5-triazine,
2,4,6-Tris(4'-carboxybutylamino)-1,3,5-triazine,
2,4,6-Tris(11'-carboxyundecylamino)-1,3,5-triazine,
2,4,6-Tris(5'-carboxypentyl-N-methylamino)-1,3,5-triazine,
2,4,6-Tris(carboxymethyl-N-methylamino)-1,3,5-triazine,
2,4,6-Tris(3'-carboxypropyl-N-methylamino)-1,3,5-triazine,
2,4-Bis(5'-carboxypentylamino)-6-n-octylamino)-1,3,5-triazine,
2,4-Bis(2'-carboxyethylamino)-6-n-octylamino)-1,3,5-triazine,
2,4-Bis(2'-carboxyethylamino)-6-diethylamino)-1,3,5-triazine,
2,4-Bis(2'-carboxyethylamino)-6-butylamino)-1,3,5-triazine,
2,4-Bis(2'-carboxyethylamino)-6-ethylamino)-1,3,5-triazine,
2,4-Bis(3'-carboxypropylamino)-6-ethylamino)-1,3,5-triazine,
2,4-Bis(3'-carboxypropylamino)-6-n-octylamino)-1,3,5-triazine,
2,4-Bis(3'-carboxypropylamino)-6-n-propylamino)-1,3,5-triazine,
2,4-Bis(carboxymethylamino)-6-n-octylamino)-1,3,5-triazine,
2,4-Bis(carboxymethylamino)-6-dodecylamino)-1,3,5-triazine,
2,4-Bis(5'-carboxypentyl-N-methylamino)-6-ethylamino)-1,3,5-triazine,
2,4-Bis(3'-carboxypropyl-N-methylamino)-6-n-octylamino)-1,3,5-triazine, 2,4-Bis(carboxymethyl-N-methylamino)-6-n-octylamino)-1,3,5-triazine,
2,4-Bis(2'-carboxyethyl-N-methylamino)-6-n-octylamino)-1,3,5-triazine,
2,4-Bis(5'-carboxypentylamino)-6-(2''-carboxyethylamino)-1,3,5-triazine,
2,4-Bis(5'-carboxypentylamino)-6-(carboxymethylamino)-1,3,5-triazine,
2,4-Bis(3'-carboxypropylamino)-6-(2''-carboxyethylamino)-1,3,5-triazine,
2,4-Bis(2'-carboxyethylamino)-6-(5''-carboxypentylamino)-1,3,5-triazine,
2,4-Bis(3'-carboxypropylamino)-6-(5''-carboxypentylamino)-1,3,5-triazine. The compounds of formula I are not new. These compounds and their production are described e.g. in Zhurnal Analiticheskoi Khimii 15, 419–423 (1960), in DE-OS 1935010, in DE-OS 2819796, in U.S. Pat. No. 3,697,520 and in J. Prakt Chemie 23 173–85 (1963).

2-Hydroxyphosphonoacetic acid is also known as a corrosion inhibitor for use in aqueous systems, having been so described in U.S. Pat. No. 4,689,200.

2-Hydroxyphosphonoacetic acid is a known compound having been described in U.S. Pat. No. 3,032,500 and, more recently, in European Patent Application 0050792. It can be prepared by known methods e.g. by recting orthophosphorous acid, a salt or a solution thereof, or phosphorus trichloride, with glyoxylic acid, a salt or a salt or solution thereof.

(2-Benzothiazolylthio)succinic acid and 2(benzothiazolyl-thio)acetic acid are likewise recognised as corrosion inhibitors for use in coatings, including aqueous systems, having been so described in European Patent No. 129506.

The proportion of the corrosion inhibitor, component (B), in the antifreeze compositions of the present invention preferably ranges from 0.001 to 5%, more preferably from 0.002 to 0.5% and, especially, from 0.01 to 0.03%, each by weight, based on the total weight of the antifreeze composition.

The antifreeze compositions of the present invention may contain one or more further additives known to be useful in improving the properties of antifreeze compositions e.g. further corrosion inhibitors, further hard water deposit inhibitors, biocides, buffers, colourants and anti-foamants.

Auxiliary corrosion inhibitors used may be a water-soluble nitrate derived from any ionisable inorganic salt of nitric acid. Preferably sodium nitrate or potassium nitrate are used in order to protect corrosion of aluminium. A water soluble nitrite can be used which is specific for protection of mild steel and cast iron. It is preferable to employ sodium and potassium nitrites. The proportion of nitrate employed, calculated as sodium nitrate is generally about 0.1 wt % to about 1.0, preferably 0.1 to 0.5 wt % based on the weight of antifreeze concentrate. The proportion of nitrite, calculated as sodium nitrite is preferably 0.05 to 0.5 wt % based on the weight of antifreeze concentrate. The antifreeze concentrate preferably contains a water soluble inorganic silicate such as sodium metasilicate in the concentration range of from 0.1 to 1.0 weight % upon the total weight of antifreeze concentrate. This provides protection of aluminium against corrosion.

It is common practice to employ a silicate stabiliser which is a water-soluble siloxane as exemplified in U.S. Pat. Nos. 4,648,982, 4,362,644 and 4,434,065. The ratio of silicate to silicone is preferably 4 to 8.

To provide protection from corrosion of copper and brass the antifreeze preferably contains at least one water-soluble copper deactivator such as sodium benzotriazole, sodium tolyltriazole and salts of mercaptobenzothiazoles. These metal deactivators calculated as the sodium salts are used at around 0.1 to 0.5% weight of the antifreeze concentrate but preferably between 0.05 to 0.5% and most preferably between 0.1 to 0.25 weight % of the antifreeze concentrate.

The buffer employed may be a carbonate, borate or phosphate available as their sodium or potassium salts. The amount of buffer used is such that the pH of the resulting coolant will have a reserve alkalinity of at least 5 for a coolant and at least 10 for a concentrate.

Further hard water deposit inhibitors include e.g. polymerised acrylic acid (or its salts), phosphinopolycarboxylic acids (as described and claimed in British Patent 1458235), the cotelomeric compounds described in European Patent Application No. 0150706, hydrolysed polyacrylonitrile, polymerised meth-acrylic acid and its salts, polyacrylamide and copolymers thereof from acrylic and methacrylic acids, lignin sulphonic acid and its salts, tannin, naphthalene sulphonic acid/formaldehyde condensation products, starch and its derivatives, cellulose, acrylic acid/lower alkyl hydroxy-acrylate copolymers, e.g. those described in U.S. Pat. No. 4,374,733 and combinations thereof. Specific threshold agents, such as for example, 2-phosphonobutane-1,2,4-tri-carboxylic acid (PBSAM), hydroxyethyl diphosphonic acid (HEDP), hydrolysed polymaleic anhydride and its salts, alkyl phosphonic acids, 1-aminoalkyl-1,1-diphosphonic acids and their salts, and alkali metal polyphosphates, may also be used.

Biocides including e.g. amines, quaternary ammonium compounds, chlorophenols, sulphur-containing compounds such as sulphones, methylene bis thiocyanates and carbamates, isothiazolones, brominated propionamides, triazines, phosphonium compounds, chlorine and chlorine-release agents and organometallic compounds such as tributyl tin oxide, may be used.

Colourants include water-soluble dyes; and antifoamants are e.g. silicones e.g. polydimethylsiloxanes, distearyl sibacamide, distearyl adipamide and related products derived from ethyl oxide and/or propylene oxide condensations in addition to fatty alcohols e.g. capryl alcohols and their ethylene oxide condensates.

The antifreeze compositions of the present invention provide excellent protection against corrosion of metal parts especially iron and aluminium metal parts which came into contact with the antifreeze compositions of the invention. In addition, the present antifreeze compositions are effective in controlling both the precipitation of insoluble calcium salts from hard waters coming into contact with the antifreeze compositions and also the precipitation of silica from any sodium metasilicate used, as corrosion inhibitor for aluminium, in the antifreeze compositions of the present invention.

The following Examples further illustrate the present invention.

EXAMPLES 1 TO 6

Preparation of Antifreeze Compositions

A Core Antifreeze Package (C.A.P.) is formulated from:

| | wt % |
|---|---|
| Ethylene glycol | 92.04 |
| Water | 3.1 |
| Sodium benzoate | 2.7 |
| Borax | 1.3 |
| Sodium nitrate | 0.3 |
| Sodium nitrite | 0.23 |
| Tolyltriazole | 0.2 |
| Sodium metasilicate pentahydrate | 0.13 |

EXAMPLE 1

To the core package (100 parts) is added 0.05 part by weight of a liquid cotelomer solution derived from co-polymerizing maleic anhydride, ethyl acrylate and vinyl acetate, and hydrolyzing with sodium hydroxide solution.

EXAMPLE 2

To the core package (100 parts) is added 0.05 part by weight of a liquid cotelomer solution derived from co-polymerising maleic anhydride, ethyl acrylate and vinyl acetate and hydrolysing with sodium hydroxide solution. To this is then added 0.01 parts of the sodium salt of 2,4,6-tris(5'-carboxypentylamino)-1,3,5-triazine.

EXAMPLE 3

To the antifreeze preparation described in Example 1 is added a further 0.01% of the sodium salt of 2,4,6-tris(5'-carboxypentylamino)-1,3,5-triazine.

EXAMPLE 4

The antifreeze preparation of Example 1 is modified to accommodate a further 0.02% of the sodium salt of 2,4,6-tris(5'-carboxypentylamino)-1,3,5-triazine.

EXAMPLE 5

To the core package (100 parts) is added 0.05 part by weight of a liquid cotelomer solution derived from co-polymerising maleic anhydride, ethyl acrylate and vinyl acetate and hydrolysing with sodium hydroxide solution. To this is then added 0.002 parts of a solution of 2-hydroxyphosphonoacetic acid.

EXAMPLE 6

To the core package (100 parts) is added 0.05 part by weight of a liquid cotelomer solution derived from co-polymerising maleic anhydride, ethyl acrylate and vinyl acetate and hydrolysing with sodium hydroxide solution. To this is then added 0.002 parts of (2-benzothiazolylthio)succinic acid.

EXAMPLES 7 TO 12

Evaluation of Antifreeze compositions

The antifreeze cmpositions prepared in Examples 1 to 6 are tested in the ASTM D-1384 Glassware Corrosion Test, modified to use the ASTM corrosive water with 0.3449 g/l of $CaSO_4.2H_2O$ added (equivalent of 200 ppm $CaCO_3$ hardness).

Metal specimens used are cleaned according to the method described in ASTM D-1384.

Table: ASTM D-1384 Glassware Test (with modified water) (wt. loss $mg/in^2$).

The results obtained are summarised in the following Table.

| Example | Antifreeze composition | Metal specimen | | | | | |
|---|---|---|---|---|---|---|---|
| | | Cu | 70/30 solder | Brass | Steel | Fe | Al (RM4) |
| Control | C.A.P. (33%) in standard corrosive water | 0.09 | 2.51 | 0.23 | −0.12 | 0.96 | 0.61 |
| 7 | Product of Example 1 | 0.12 | 1.05 | 0.07 | 0.02 | 0.20 | −0.50 |
| 8 | Product of Example 2 | 0.21 | 0.77 | 0.07 | 0.30 | 0.80 | −0.11 |
| 9 | Product of Example 3 | 0.21 | 0.44 | 0.51 | 0.26 | 0.41 | −0.26 |
| 10 | Product of Example 4 | 0.23 | 0.98 | 0.14 | 0.16 | 0.11 | −0.15 |
| 11 | Product of Example 5 | 0.19 | 0.93 | 0.09 | 0.28 | 0.41 | −0.17 |
| 12 | Product of Example 6 | 0.09 | 0.47 | 0.07 | 0.00 | 0.02 | 0.02 |

The results in the Table demonstrate the excellent all-round metal protection exhibited by the antifreeze compositions according to the present invention, in particular the improved solder and brass protection relative to the control composition.

We claim:

1. A polyhydric alcohol antifreeze composition comprising

A) as hard water deposition inhibitor, 0.001 to 1% by weight, based on the total weight of the antifreeze composition, of a hydrolyzed copolymer of maleic anhydride with a mono-ethylenically unsaturated monomer, or mixture of monomers, the molar ratio of maleic anhydride to other monomers being from 2.5:1 to 100:1, and the molecular weight of the copolymer being below 1000, and B) as corrosion inhibitor, 0.001 to 5% by weight, based on the total weight of the antifreeze composition, of at least one compound selected from the group consisting of B-1) a triazine compound having the formula I

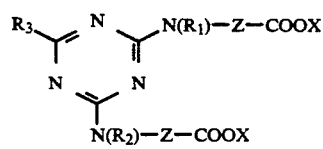

wherein

Z is $C_1$–$C_{11}$-alkylene,

X is hydrogen, an alkali metal or a mono-, di- or tri-ethanolamine group,

R₁ and R₂ are independently hydrogen or methyl, and

R₃ is —NR₄R₅ in which R₄ is $C_1$–$C_{12}$-alkyl or —Z—COOX, and R₅ is hydrogen or $C_1$–$C_{12}$-alkyl;

B-2) 2-hydroxyphosphonoacetic acid;
B-3) 2-benzothiazolylthiosuccinic acid; and
B-4) 2-benzothiazolylthioacetic acid.

2. An antifreeze composition according to claim 1 wherein the compound of formula I is 2,4,6-tris-(5′-carboxypentyl-amino)-1,3,5-triazine.

3. An antifreeze composition according to claim 1, wherein the polyhydric alcohol is ethylene glycol or a mixture of ethylene glycol and diethylene glycol.

4. An antifreeze composition according to claim 1 wherein the proportion of component A) ranges from 0.005 to 0.5% by weight, based on the weight of the antifreeze composition.

5. An antifreeze composition according to claim 4 wherein the proportion of component A) ranges from 0.01 to 0.05% by weight, based on the total weight of the antifreeze composition.

6. An antifreeze composition according to claim 1 wherein the proportion of component B) ranges from 0.002 to 0.5% by weight, based on the total weight of the antifreeze compositions.

7. An antifreeze composition according to claim 6 wherein the proportion of component B) ranges from 0.01 to 0.3% by weight, based on the total weight of the antifreeze composition.

8. An antifreeze composition according to claim 1 wherein one or more further additives, known to be useful in antifreeze compositions, are also present.

9. An antifreeze composition according to claim 8 wherein the further additive is one or more of a further corrosion inhibitor, a further hard water deposit inhibitor, a metal deactivator, a biocide, a buffer, a colourant and an antifoamant.

10. An antifreeze composition according to claim 9 wherein the further corrosion inhibitor is one or more of an alkali metal nitrate, an alkali metal nitrite and a water-soluble alkali metal silicate.

11. An antifreeze composition according to claim 9 wherein the metal deactivator is benzotriazole, tolutriazole or mercaptobenzthiazole, or an alkali metal salt thereof.

12. An antifreeze composition according to claim 9 wherein the buffer is an alkali metal carbonate, borate or phosphate.

13. A coolant for an internal combustion engine comprising an antifreeze composition as claimed in claim 1.

14. A method of applying hard water deposition inhibition properties to an antifreeze composition according to claim 1 in a cooling system of an internal combustion engine by adding an effective amount of a compound A) according to claim 1 to said antifreeze composition.

* * * * *